United States Patent
Mundell

(10) Patent No.: US 7,854,479 B2
(45) Date of Patent: Dec. 21, 2010

(54) OVERMOLDED LUMBAR SUPPORT APPARATUS AND METHOD

(75) Inventor: Donald David Mundell, Carthage, MO (US)

(73) Assignee: L&P Property Management Company, South Gate, CA (US)

(*) Notice: Subject to any disclaimer, the term of this patent is extended or adjusted under 35 U.S.C. 154(b) by 466 days.

(21) Appl. No.: 11/742,168

(22) Filed: Apr. 30, 2007

(65) Prior Publication Data

US 2008/0264425 A1 Oct. 30, 2008

(51) Int. Cl.
- *A47C 3/00* (2006.01)
- *A47C 7/42* (2006.01)
- *A47C 7/02* (2006.01)
- *B32B 37/00* (2006.01)

(52) U.S. Cl. .......... 297/284.4; 602/19; 297/284.5; 297/284.1; 297/452.56; 264/261; 264/279; 74/502.4

(58) Field of Classification Search .......... 602/19; 297/284.4; 74/501.5 R, 500.5, 501.5 H, 501.6, 74/502.4, 502.6
See application file for complete search history.

(56) References Cited

U.S. PATENT DOCUMENTS

| | | | |
|---|---|---|---|
| 2,876,499 A * | 3/1959 | Schultz | 264/277 |
| 2,903,388 A * | 9/1959 | Lintner et al. | 264/258 |
| 2,988,773 A * | 6/1961 | Logan | 425/439 |
| 3,707,761 A * | 1/1973 | LaBranche | 29/446 |
| 5,114,209 A | 5/1992 | Dunn | |
| 5,143,057 A | 9/1992 | DePasquale | |
| 5,733,493 A | 3/1998 | Katsuno et al. | |
| 5,954,399 A * | 9/1999 | Hong | 297/284.4 |
| 6,071,446 A * | 6/2000 | O'Brien et al. | 264/46.5 |
| 6,079,783 A * | 6/2000 | Schuster et al. | 297/284.4 |
| 6,125,521 A | 10/2000 | Stumpf et al. | |
| 6,179,362 B1 | 1/2001 | Wisniewski et al. | |
| 6,234,578 B1 | 5/2001 | Barton et al. | |
| 6,306,628 B1 * | 10/2001 | Rothschild et al. | 435/91.3 |
| 6,575,530 B1 | 6/2003 | Fischer et al. | |
| 6,644,740 B2 | 11/2003 | Holst et al. | |
| 6,688,686 B1 | 2/2004 | McEvoy et al. | |
| 6,739,673 B2 | 5/2004 | Gupta et al. | |
| 6,758,522 B2 | 7/2004 | Ligon, Sr. et al. | |
| 6,811,218 B2 | 11/2004 | Deimen et al. | |
| 6,820,933 B2 * | 11/2004 | Fereira Da Silva | 297/284.1 |
| 6,966,604 B2 | 11/2005 | Stumpf et al. | |
| 6,969,115 B2 | 11/2005 | Bourdkane et al. | |

(Continued)

FOREIGN PATENT DOCUMENTS

EP 1680983 A1 7/2006

(Continued)

OTHER PUBLICATIONS

PCT International Search Report for PCT/US2008/005507.

*Primary Examiner*—Patricia M Bianco
*Assistant Examiner*—Victoria Hicks
(74) *Attorney, Agent, or Firm*—Grant D. Kang; Kang Intellectual Property Law, LLC

(57) ABSTRACT

The invention relates to a thin profile adjustable lumbar support system, particularly for use in automotive seat backs and other equipment used for sitting and reclining. The lumbar support system is assembled utilizing injection molding and overmolding technology to form some components and connect other components.

21 Claims, 7 Drawing Sheets

U.S. PATENT DOCUMENTS

| | | |
|---|---|---|
| 6,983,997 B2 | 1/2006 | Wilkerson et al. |
| 6,997,515 B2 | 2/2006 | Gupta et al. |
| 7,231,957 B2 * | 6/2007 | Gregory et al. ............... 164/54 |
| 7,425,036 B2 * | 9/2008 | McMillen ................ 297/284.4 |
| 2003/0001424 A1 * | 1/2003 | Mundell et al. ........ 297/452.56 |
| 2005/0017555 A1 | 1/2005 | Elliot |
| 2005/0231013 A1 | 10/2005 | Knoblock et al. |
| 2006/0061170 A1 | 3/2006 | Massara et al. |
| 2006/0273643 A1 * | 12/2006 | McMillen ................ 297/284.4 |
| 2007/0236063 A1 * | 10/2007 | Blendea ................... 297/284.4 |

FOREIGN PATENT DOCUMENTS

| | | |
|---|---|---|
| EP | 1733649 A1 | 12/2006 |

* cited by examiner

US 7,854,479 B2

OVERMOLDED LUMBAR SUPPORT APPARATUS AND METHOD

BACKGROUND OF THE INVENTION

1. Field of the Invention

The present invention relates to the field of lumbar support systems, especially as such systems are used in automotive seats and chair back rests.

2. Related Art

Lumbar support systems have become a popular feature for use in automotive seats, office chairs, beds, lounge chairs and various other furniture and equipment used for sitting or reclining. Numerous and varied designs of lumbar support systems have been developed and produced.

The manufacture of many lumbar support systems requires that a number of distinct components be hand assembled or assembled by automatic equipment. This assembly process is a component of the cost and time required to manufacture such systems.

SUMMARY OF THE INVENTION

In an embodiment of the present invention, a portion of a lumbar support system is formed when material is injection molded to form a connector portion that connects a hanger wire and a terminal end portion of a bowden cable assembly conduit.

It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or its uses.

Figure 1:
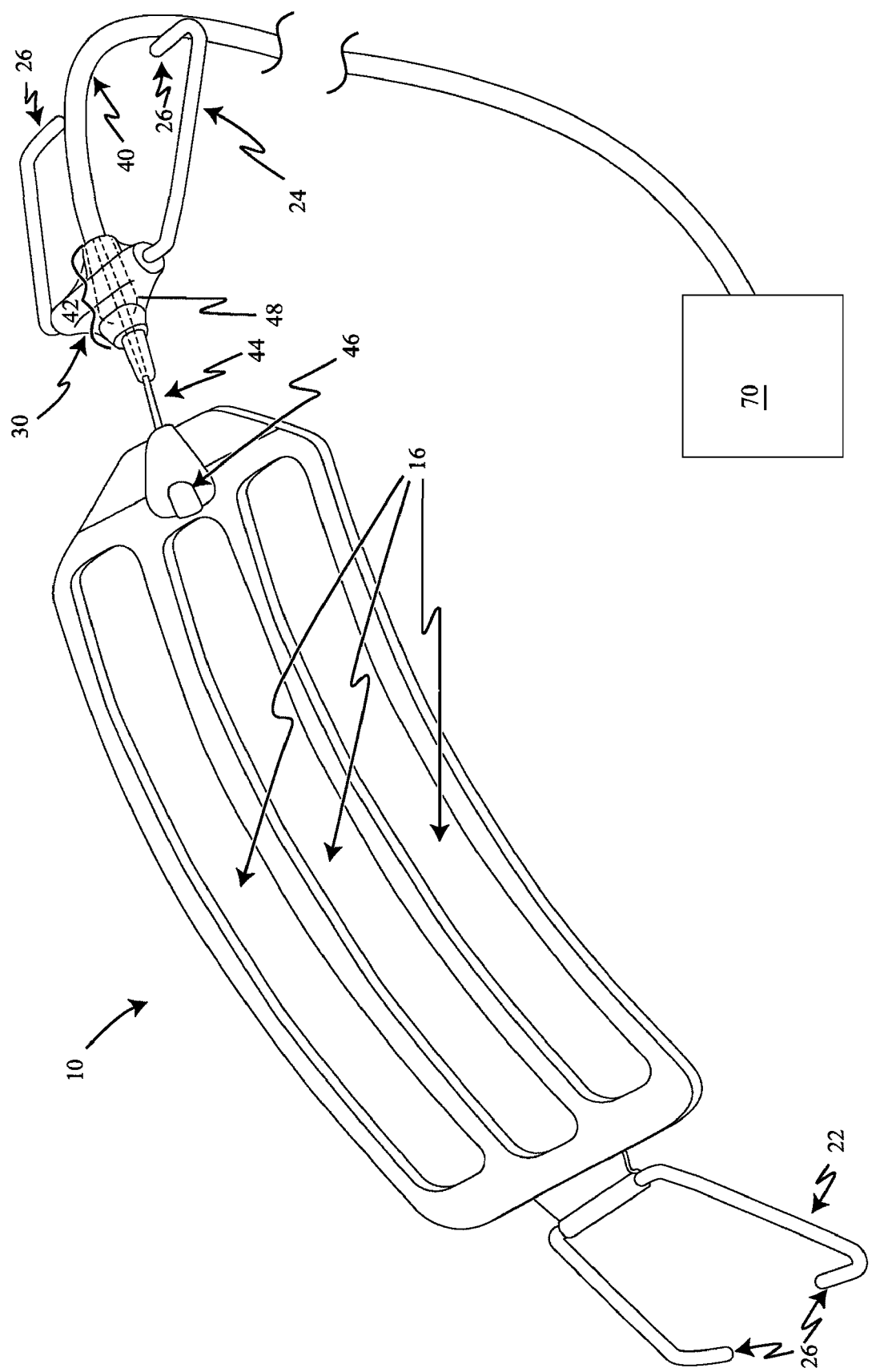
FIG. 1 illustrates a plan view of an overmolded lumbar support system.
Figure 2:
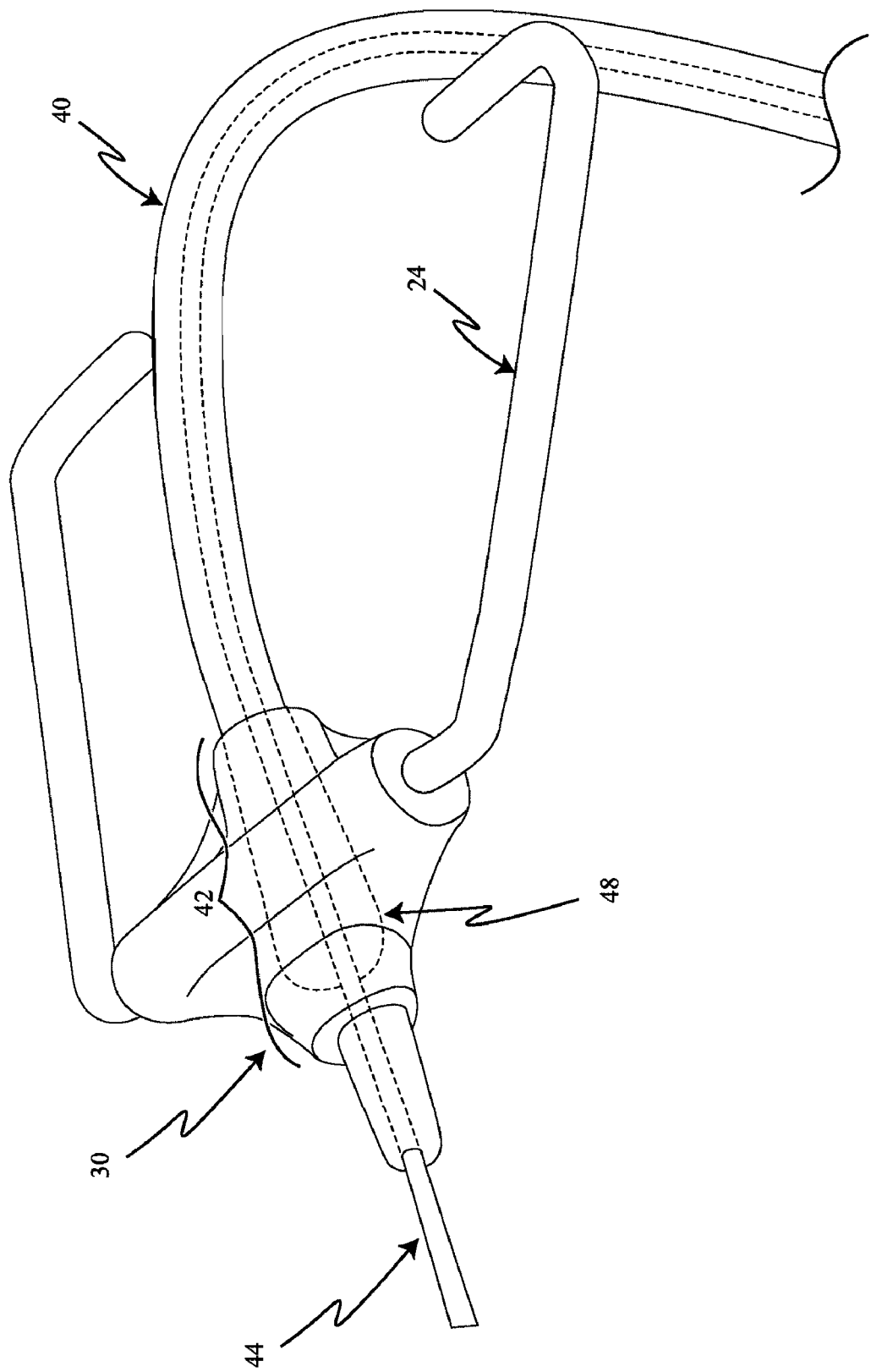
FIG. 2 illustrates a plan view of the injection molded connection of a bowden cable and a hanger wire.

FIGS. 1 and 2 depict a thin profile, flexible lumbar support system comprising a first hanger wire 24, a second hanger wire 22, a bowden cable assembly 40, an injection molded flexible lumbar strap 10 and a injection molded connector portion 30. The bowden cable assembly 40 consists of a section 42 of a conduit, through which a wire 44 runs, and the wire 44 terminates in a bullet connector 46.

According to an embodiment of the present invention the lumbar support system is manufactured by arranging the first hanger wire 24, second hanger wire 22, and bowden cable assembly 40 in a mold cavity of an injection molding apparatus. The injection molding apparatus injects a plastic into the mold cavity which forms the flexible lumbar strap 10 and the injection molded connector portion 30. The injection molded flexible lumbar strap 10 and injection molded connector portion 30 connect the first hanger wire 24, second hanger wire 22 and bowden cable assembly 40, as shown in FIGS. 1-2 and described in greater detail below.

On one side of the flexible lumbar strap 10, a portion of the second hanger wire 22 is overmolded to form the flexible lumbar strap 10, such that the second hanger wire 22 is integrally connected to the flexible lumbar strap 10 in a hinge-like manner. That is to say, the second hanger wire 22 is connected to the flexible lumbar strap 10 in such a way that rotation of the hanger wire, with respect to the flexible lumbar strap, about the axis of the overmolded portion is possible, but rotation about any other axis and translation of the second hanger wire 22 with respect to the flexible lumbar strap 10 is restricted.

The overmolding of the second hanger wire 22 preferably occurs during the same process in which the flexible lumbar strap 10 is formed, and the material that connects the flexible lumbar strap 10 to the second hanger wire 22 is preferably the same as the material that forms the body of the flexible lumbar strap 10. Thus, a continuous connection is formed between the flexible lumbar strap 10 and the second hanger wire 22.

The body of the flexible lumbar strap 10 may consist of any design that is conducive to a desirable response to applied tensile forces. In the embodiment of the present invention depicted in FIGS. 1-2, the flexible lumbar strap 10 has three elongated openings 16. The number and size of the openings 16 as well as the material used and the thickness of the flexible lumbar strap 10 may be modified to achieve desired design parameters, such as a target elasticity and yield strength, for a corresponding design width of the flexible lumbar strap 10.

On the side of the flexible lumbar strap 10 opposite the connection to the first hanger wire 24, the bullet connector 46 of the bowden cable assembly 40 is overmolded. The bullet connector 46 is preferably overmolded during the same process in which the flexible lumbar strap 10 is formed and the second wire hanger 22 is overmolded, and preferably the same material is used to overmold the bullet connector 46 that was used to form the flexible lumbar strap 10, such that the bullet connector 46 is integrally connected to the flexible lumbar strap 10. While a bullet connector 46 is used in this embodiment of the invention, numerous types of connectors, such as an eye hook, could be used in place of a bullet.

The injection molded connector portion 30 is formed apart from the flexible lumbar strap 10 and is connected to the flexible lumbar strap 10 only by the wire 44. In the formation of the injection molded connector portion 30, portions of both the second wire hanger 24 and the bowden cable assembly 40 are overmolded, preferably as described below.

A portion of the first wire hanger 24 is overmolded such that it is integrally connected to the injection molded connector portion 30 in a hinge-like manner. That is to say the connection of the first wire hanger 24 to the injection molded connector portion 30 is such that rotation, with respect to the injection molded connector portion 30, of the first wire hanger 24 is possible about the axis of the overmolded portion of the first wire hanger 24. However, once the injection molded connector portion 30 is formed, and with respect thereto, the first wire hanger 24 is restricted from translation and rotation about any other axis.

During the formation of the injection molded connector portion 30, a section 42 of a conduit of the bowden cable assembly 40 is also overmolded, as best seen in FIG. 2. The overmolded portion of the section 42 of a conduit is held in place by the injection molded material and is, therefore, secure in relation to the injection molded connector portion 30. Preferably the overmolded portion of the section 42 of a conduit is approximate to the terminal 48 of the section 42 of a conduit and extends slightly beyond the injection molded connector portion 30.

Figure 3:
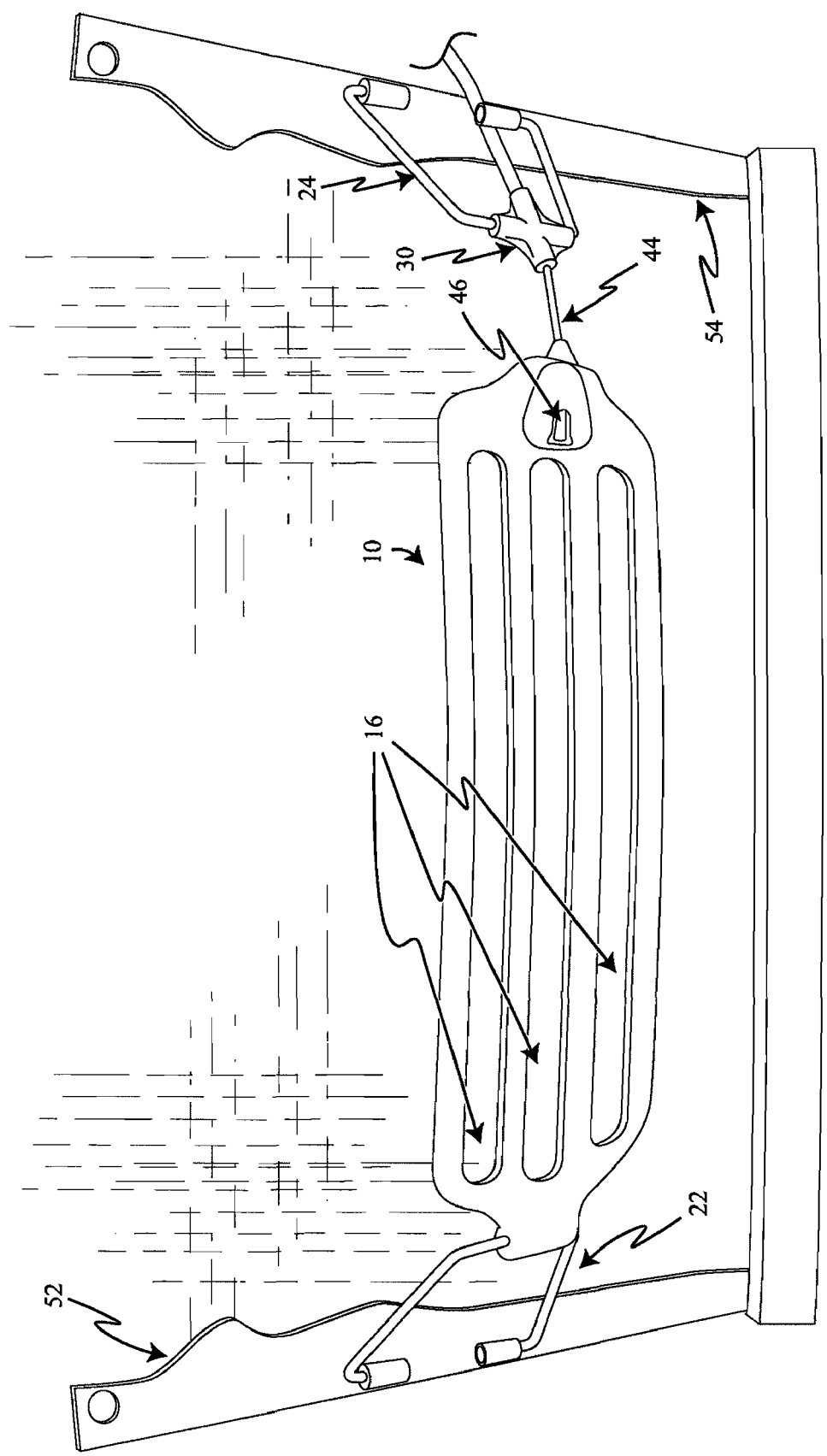
FIG. 3 illustrates a perspective view of an overmolded lumbar support system as attached to a seat.
Figure 4:
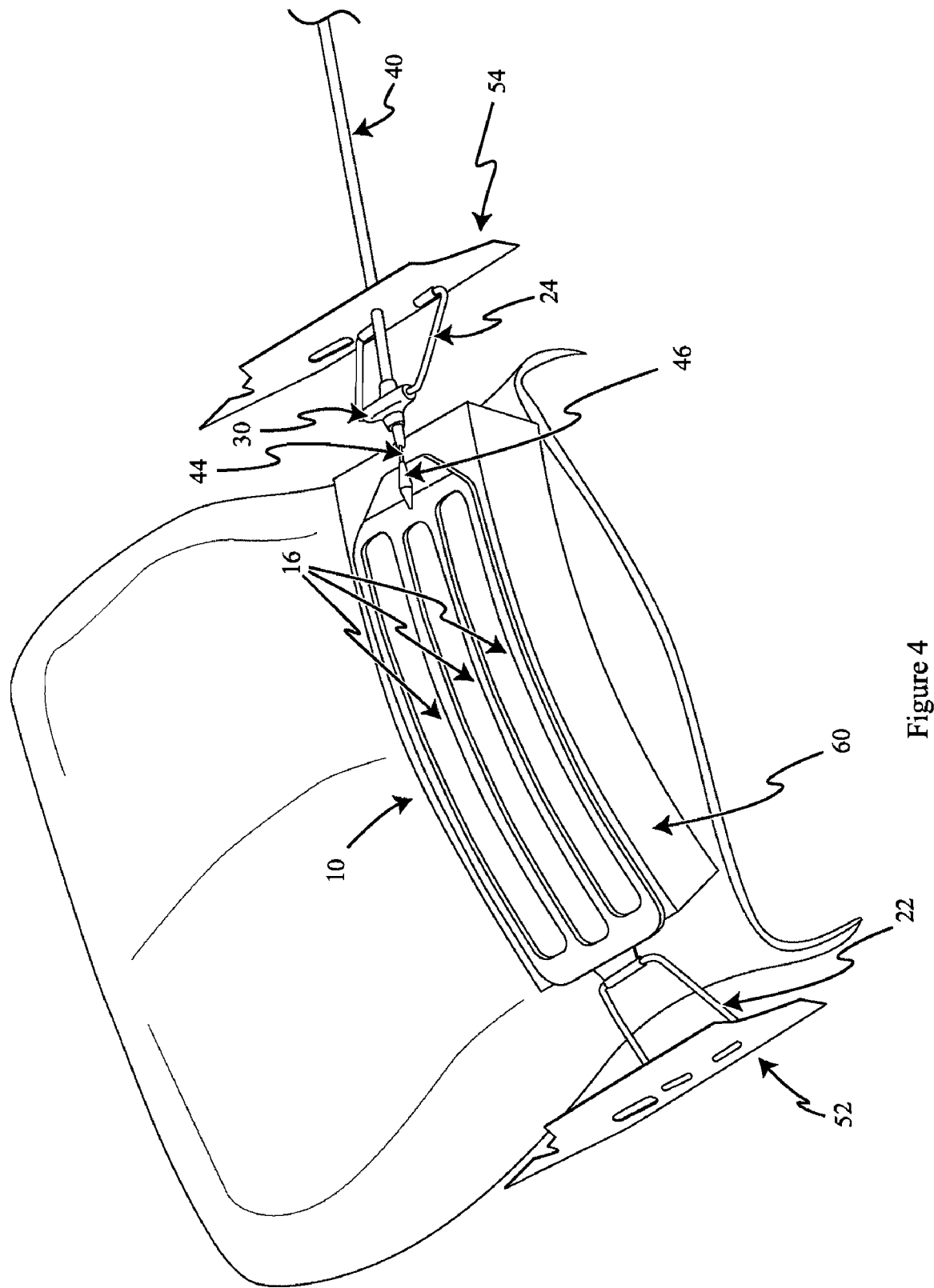
FIG. 4 illustrates a perspective view of an overmolded lumbar support system attached to a seat with an intermediate material between the seat back and the flexible lumbar strap.
Figure 5A:
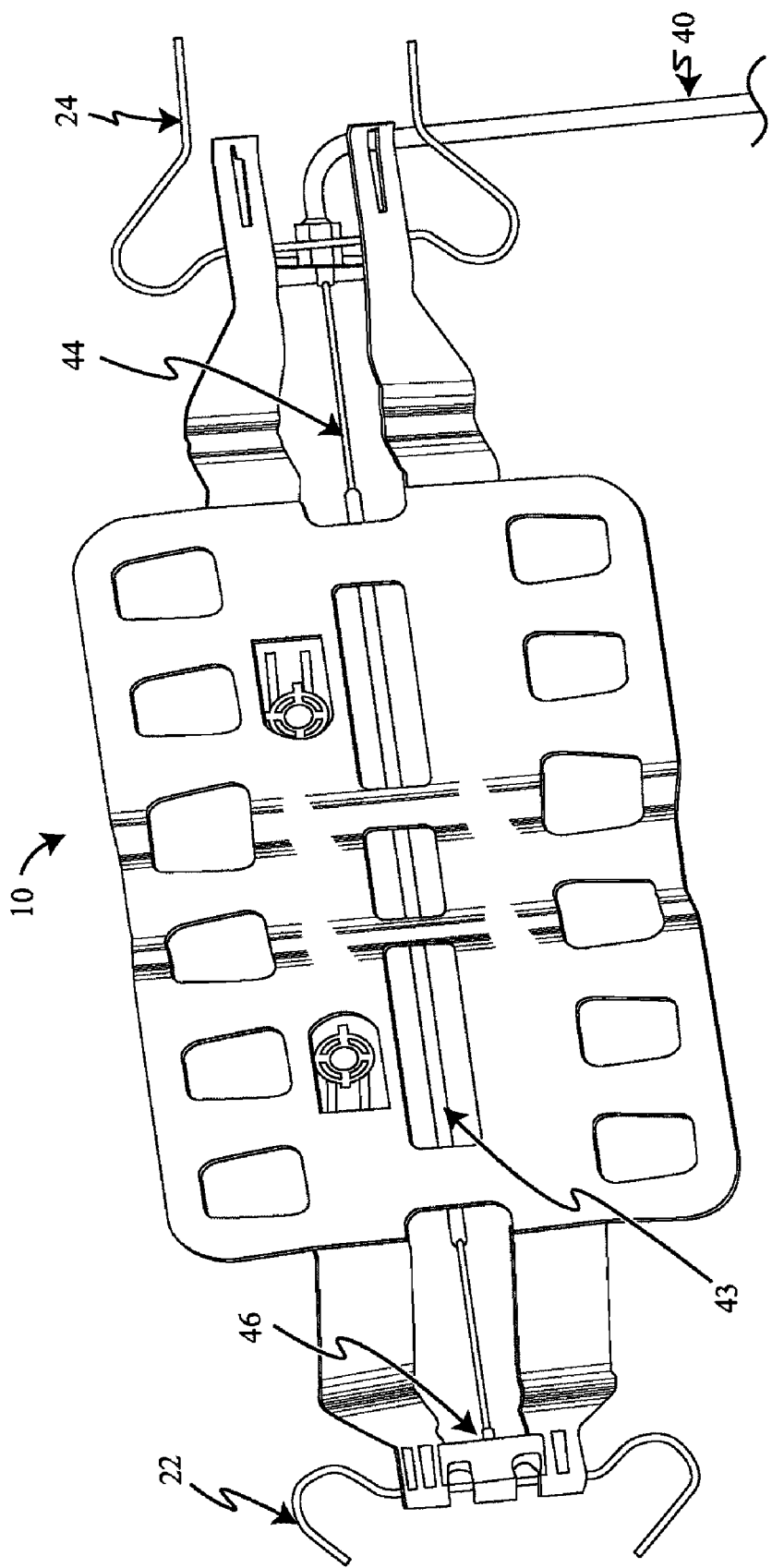
FIG. 5 illustrates several views of one embodiment of the invention.
Figure 5B:
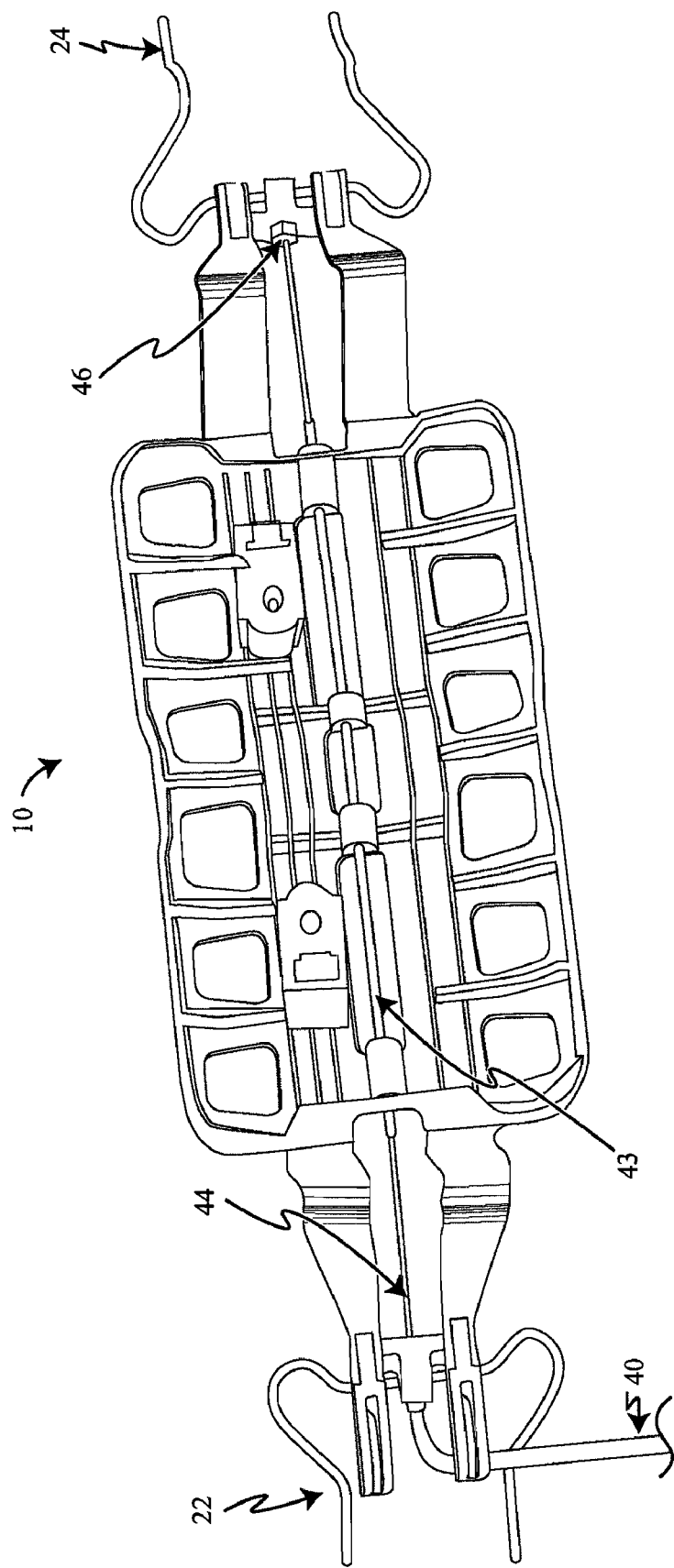
Figure 5C:
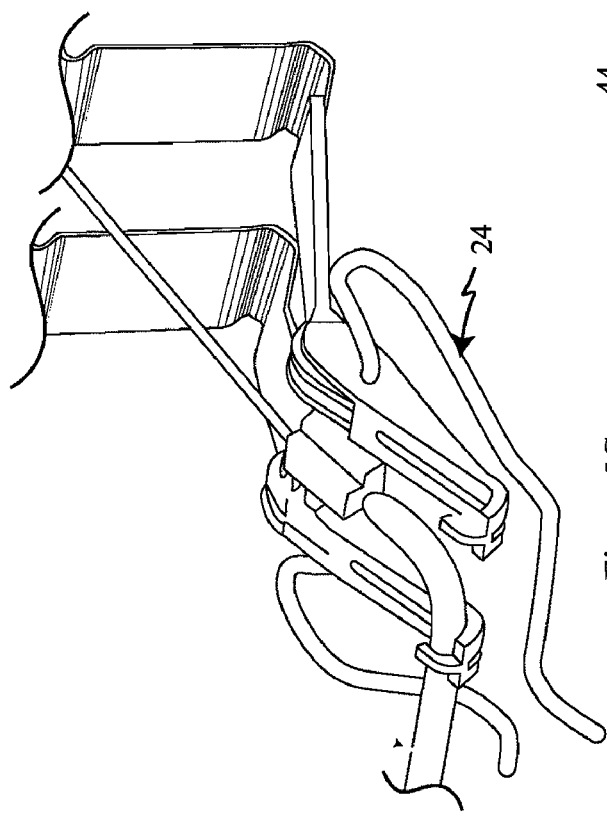
Figure 5D:
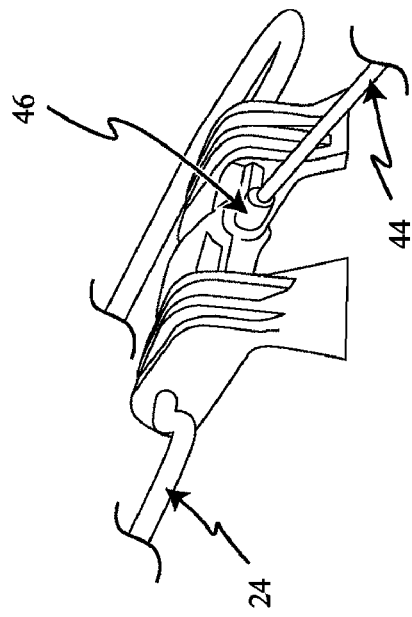
Figure 5E:
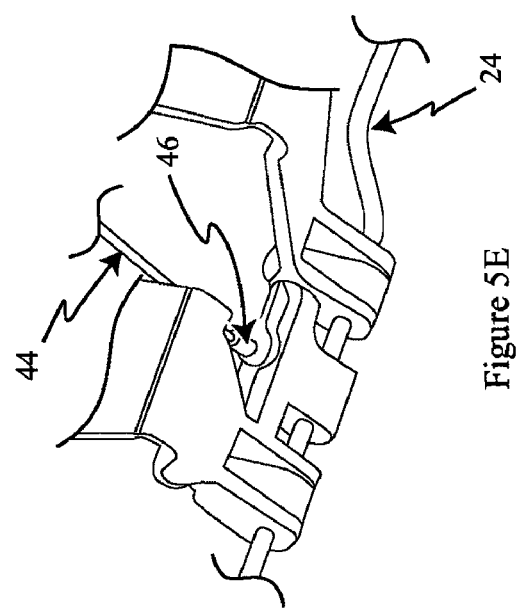

As shown in FIGS. 3 and 4, when attached to a seat for use, the first hanger wire 24 and second hanger wire 22 are attached to first and second support structures 54, 52, such as opposing columns of a seat frame, such that the flexible lumbar strap 10 extends across the back of the seat 50. The first and second hangers 24, 22 are attached to the support structures 54, 52 in a rotatable manner allowing the lumbar strap 10 to be pressed forward into the seat back 50 or relaxed backwards away from the seat back 50. As best seen in FIG. 1, a material, preferably plastic, may be overmolded onto the end portions 26 of the first and second wire hangers 24, 22 to provide a more desirable interface where the end portions 26 connect to the frame.

In an alternate embodiment, shown in FIG. 4, an intermediate material 60 may be disposed between the flexible lumbar strap 10 and the back of the seat 50, so as to either provide a greater range of lumbar support movement or provide lumbar support that is more comfortable for an end user.

The embodiment of the invention shown in FIG. 5 comprises a flexible lumbar strap 10, a bowden cable assembly 40, a first and second wire hanger 24, 22, and a secondary conduit 43. According to this embodiment, the first wire hanger 24 and the terminal portion of the section 42 of a conduit of the bowden cable assembly 40 are overmolded and integrally connected to a first side of the flexible lumbar strap 10. The wire 44 of the bowden cable assembly 40 passes through the secondary conduit 43, which is overmolded and integrally attached to a central portion of the flexible lumbar strap 10. The second wire hanger 22 and the bullet connector 46 at the terminal end of the wire 44 are overmolded to a second side of the flexible lumbar strap 10. The flexible lumbar strap 10 is preferably formed and/or situated such that it is arched when little or no tension is applied to the wire 44. Accordingly, when tension is applied to the wire 44 the arch in the flexible lumbar strap 10 is reduced, thereby applying pressure to the seat back 50 and, in turn, to the lumbar region of an end user.

As shown in FIG. 1 the end of the bowden cable assembly 40 that is not attached to the flexible lumbar strap 10 and injection molded connector portion 30 is operatively attached to an actuator 70. The actuator 70 may vary in complexity and performance from a very simple and inexpensive mechanical device, to a more expensive and complex electrically driven device. Regardless of the complexity of the actuator 70, its purpose is to create and relieve, as directed by the end user, a tensile force in the wire 44. This tensile force is transmitted by the wire 44 to the flexible lumbar strap 10, which, in turn, exerts a force against the back of the seat 50, either directly or by way of an intermediate material 60. The force exerted against the back of the seat 50 by the lumbar strap 10 causes the lumbar region of the back of the seat 50 to press outwardly, thereby providing support to the lumbar region of an end user. Conversely, when the force applied to the flexible lumbar strap 10 is reduced, the force applied to the back of the seat 50 is reduced, allowing the back of the seat to recede. Thus, an end user is provided ultimate control over the extent of the lumbar support provided by the seat.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of assembling a lumbar support system in a seat having a seat frame, comprising:
   providing a bowden cable assembly having a first and second end and comprising a conduit and a wire, wherein the first end of the bowden cable assembly comprises a terminal portion of the conduit, a portion of the wire that extends beyond the terminal portion of the conduit, and a terminal of the wire;
   providing a lumbar support attached to the terminal of the wire;
   providing a first hanger for connecting the lumbar support and the terminal portion of the conduit to the seat frame of the seat;
   placing a portion of the first hanger and a portion of the first end of the bowden cable assembly in a first mold cavity; and
   attaching the terminal portion of the conduit and the portion of the first hanger by injecting material into the first mold cavity such that the material is overmolded around the terminal portion of the conduit and the portion of the first hanger.

2. The method of claim 1 wherein the lumbar support comprises an injection molded lumbar strap, the method further comprising:
   placing the terminal of the wire in a second mold cavity; and
   injecting material into the second mold cavity, wherein the injection of material into the second mold cavity forms the lumbar strap and overmolds the terminal of the wire, such that the terminal of the wire is integrally connected to the lumbar strap.

3. The method of claim 2 further comprising:
   providing a second hanger; and
   placing a portion of the second hanger in the second mold cavity such that the injection of the second material overmolds the portion of the second hanger and such that the second hanger is integrally connected to the lumbar strap.

4. The method of claim 3 further comprising:
   attaching the first hanger to a first support structure in a rotatable manner; and
   attaching the second hanger to a second support structure in a rotatable manner, wherein the first and second support structures are on opposing sides of a seat back such that the lumbar strap extends across the seat back.

5. The method of claim 4 further comprising disposing an intermediate material between the lumbar strap and the seat back.

6. The method of claim 4 further comprising overmolding a material onto a portion of at least one of the first hanger and the second hanger that is in contact with either the first support structure or the second support structure.

7. The method of claim 1 wherein the lumbar support comprises a lumbar strap, the method further comprising:
   forming the lumbar strap by injection molding; and
   overmolding the terminal of the wire such that the terminal of the wire is integrally connected to the lumbar strap;
   wherein the lumbar strap is integrally connected to the first hanger and the terminal portion of the conduit.

8. The method of claim 7 wherein the lumbar strap is formed in the first mold cavity, and the terminal of the wire is overmolded in the first mold cavity.

9. The method of claim 7 further comprising:

providing a second hanger; and overmolding a portion of the second hanger such that the second hanger is integrally connected to the lumbar strap and such that the overmolded portion of the second hanger is approximate to the terminal of the wire.

10. The method of claim 7 further comprising:

providing a secondary conduit; and overmolding a portion of the secondary conduit such that the secondary conduit is integrally connected to the lumbar strap;

wherein the secondary conduit is disposed between the terminal of the wire and the terminal portion of the conduit; and wherein the wire passes through the secondary conduit.

11. The method of claim 1 further comprising providing an actuator in operative connection with the second end of the bowden cable assembly.

12. A lumbar support system for a seat having a seat frame, comprising:

a bowden cable assembly having a first end and a second end and comprising a conduit and a wire, wherein the first end of the bowden cable assembly comprises:

a terminal portion of the conduit, a portion of the wire that extends beyond the terminal portion of the conduit, and a terminal of the wire;

a lumbar support attached to the terminal of the wire;

a first hanger for connecting the lumbar support and the terminal portion of the conduit to the seat frame of the seat; and an injection molded material that is formed around the terminal portion of the conduit and a portion of the first hanger such that the terminal portion of the conduit and the portion of the first hanger are integrally connected.

13. The lumbar support system of claim 12, wherein the lumbar support comprises an injection molded lumbar strap that is formed around and integrally connected to the terminal of the wire.

14. The lumbar support system of claim 13 further comprising a second hanger, wherein a portion of the second hanger is overmolded such that the second hanger is integrally connected to the lumbar strap.

15. The lumbar support system of claim 14 further comprising:

a seat back; and wherein the seat frame comprises a first and second support structure, wherein the first and second support structures are on opposing sides of the seat back, the first hanger is rotatably attached to the first support structure and the second hanger is rotatably attached to the second support structure, such that the lumbar strap extends between the first and second hangers across the seat back.

16. The lumbar support system of claim 15 further comprising an intermediate material disposed between the seat back and the lumbar strap.

17. The lumbar support system of claim 13 wherein the lumbar strap is integrally connected to the first hanger and the terminal portion of the conduit.

18. The lumbar support system of claim 17 further comprising a second hanger, wherein a portion of the second hanger is overmolded such that the second hanger is integrally connected to the lumbar strap.

19. The lumbar support system of claim 17 further comprising a secondary conduit integrally connected to the lumbar strap and disposed between the terminal portion of the conduit and the terminal of the wire, wherein the wire passes through the secondary conduit.

20. The lumbar support system of claim 13 wherein the lumbar strap is connected to the first hanger by way of the wire.

21. The lumbar support system of claim 12 further comprising an actuator operatively connected to the second end of the bowden cable assembly.

* * * * *